United States Patent [19]

Dyer et al.

[11] 4,356,156

[45] Oct. 26, 1982

[54] ZEOLITES BEARING FLUORIDE ANIONS

[75] Inventors: Alan Dyer, Manchester; Abraham Araya, London, both of England

[73] Assignee: Laporte Industries Limited, London, England

[21] Appl. No.: 158,127

[22] Filed: Jun. 10, 1980

[30] Foreign Application Priority Data

Jul. 3, 1979 [GB] United Kingdom ............... 7923144

[51] Int. Cl.$^3$ ................... C01B 33/28; B01J 27/06; B01J 29/06
[52] U.S. Cl. ................................ 423/328; 252/442; 252/455 Z
[58] Field of Search ............. 423/328; 252/442, 455 Z
[56] References Cited

U.S. PATENT DOCUMENTS

| 3,575,887 | 4/1971 | Wilson | 252/442 |
|---|---|---|---|
| 3,594,331 | 7/1971 | Elliott | 252/442 |
| 3,619,412 | 11/1971 | Clement et al. | 252/442 X |
| 3,630,965 | 12/1971 | Vookhies et al. | 252/442 |
| 3,933,983 | 1/1976 | Elliott | 423/328 |
| 4,054,511 | 10/1977 | Miale et al. | 252/442 X |

Primary Examiner—Edward J. Meros
Attorney, Agent, or Firm—Larson and Taylor

[57] ABSTRACT

The present invention provides the following:

(a) A fluoride-treated zeolite in which the number of equivalents of fluoride exceeds the sum of the numbers of equivalents of all cations except for hydrogen, aluminium and silicon cations in the zeolite.

(b) A process for fluoride-treating a zeolite wherein the zeolite is treated with a concentrated aqueous solution of a salt of hydrofluoric acid.

(c) A process for at least partially removing metal ions from an aqueous solution, which comprises contacting the aqueous solution, containing the metal ions, with the fluoride-treated zeolite specified in (a) above or produced as specified in (b) above.

(d) A process for the chromatographic separation of two or more metal ions in aqueous solution wherein the chromatographic stationary phase comprises the fluoride-treated zeolite specified in (a) above or produced as specified in (b) above.

11 Claims, 9 Drawing Figures

ZEOLITES BEARING FLUORIDE ANIONS

The present invention relates to zeolites.

Among the best known zeolites are the sodium zeolites of the general formula $Na_2O.Al_2O_3.xSiO_2.yH_2O$ in which y is usually non-zero and in which x can vary widely. Zeolites are also known in which the $Na_2O$ in the above formula is formally replaced, at least partially, by $K_2O$, $(NH_4)_2O$, $CaO$ or other oxides, or by mixtures of such, or other, oxides.

It is known to use zeolites as heterogeneous catalysts, as molecular sieves for the retention of neutral molecules, and as cation exchangers (in the case of a zeolite of the formula $Na_2O.Al_2O_3.xSiO_2.yH_2O$ it is the $Na^+$ ions which are displaced). Zeolites are not capable of anion exchange, however, and it has not been known to use zeolites as ion exchange vehicles for anions such as the fluoride ion.

A principle object of this invention is to extend the range of available zeolitic materials and, in particular, to provide zeolites bearing fluoride anions which might be used as a source of such anions, or otherwise, as more fully explained hereafter.

A zeolite, as is the case for any other solid material, may be used as a vehicle for surface-deposited salts. If the salts are dissolved off the zeolite surface similar proportions of anions and cations to that present in the salt are made available, as would be the case were the salt to be dissolved directly without prior surface deposition on the zeolite.

The present invention relates to a zeolite bearing fluoride anions much of which fluoride is in readily releasable form and in which the proportion of fluoride, relative to the cations in a salt used to supply fluoride anions to the zeolite, is increased.

In particular, the present invention provides a zeolite bearing fluoride anions in which the number of equivalents of fluoride anion exceeds the sum of the numbers of equivalents of all cations present in the zeolite except for hydrogen, aluminium and silicon cations.

According to a further aspect thereof the present invention, particularly, provides a process for producing a zeolite bearing fluoride anions in which the number of equivalents of fluoride anion exceeds the sum of the numbers of equivalents of all cations present in the zeolite except for hydrogen, aluminium and silicon cations wherein the zeolite is treated with a concentrated aqueous solution of a salt of hydrofluoric acid.

The precise manner in which fluoride anions, without accompanying salt cations, is accomodated in the zeolite is not known. The anions are evidently not within the basic sodalite cage of the zeolite since any occlusion of salt molecules within the sodalite cage, which has a port diameter of only about 2.2 angstroms, would be irreversible and the fluoride anions would not be available as is the present case. The fluoride anions may be within the general zeolite framework accompanied by $H^+$ cations, or may be complexed or bonded to the framework elements. The exception of hydrogen, aluminium and silicon cations from the statement of invention given above is intended to allow for this theoretical possibility.

The zeolite products of the present invention do not possess anion exchange properties and the fluoride anions may be leached from the zeolite with water or certain solvents.

Preferably, in the zeolites provided by this invention, the ratio of equivalents of fluoride to equivalents of cation present in the zeolite, other than hydrogen, aluminium and silicon cations, particularly preferably to equivalents of cation identical to the cation of the salt of hydrofluoric acid used to treat the zeolite, is at least 1.2, particularly preferably at least 1.5, for example at least 1.75. It is even possible to attain a ratio of at least 2:1 as the Examples hereafter demonstrate.

It has been found that a particularly suitable concentrated aqueous solution for the treatment of the zeolite is one of at least 50%, preferably at least 60%, by weight concentration. Preferably, the zeolite is treated at a temperature of at least 45° C., very suitably at a temperature of at least 50% for example at 60° C. Preferably, the aqueous solution used to treat the zeolite has the approximate composition $KF.2H_2O$ which solution may be prepared by melting the salt $KF.2H_2O$ (m.p. 41° C.), although solutions of similar composition may be prepared from KF and $H_2O$. Preferably, the duration of the treatment of the zeolite at least 4 hours particularly preferably at least 8 hours.

It is preferred to use as the zeolite to be treated one in which in any exchangeable cations have already been largely replaced by the same cation as is present in the concentrated aqueous solution. Such replacement is preferably performed by the use of a relatively dilute aqueous solution of the salt of hydrofluoric acid, or by the use of a relatively dilute aqueous solution of a salt of an an acid other than hydrofluoric acid. The concentration of such solution is, preferably not more than 0.5 moles/liter, particularly preferably, not more than 0.25 moles/liter. The use of a concentrated solution at this stage could cause hydroloysis. A temperature of not more than 40° C. is preferably used. The duration of the treatment is preferably at least 6 hours or even at least 12 or 24 hours when room temperature is used. Thus, if a concentrated aqueous solution containing potassium fluoride is used to fluoride-treat a zeolite, that zeolite has preferably been treated previously with a dilute aqueous solution containing potassium fluoride or, for instance, with an aqueous solution of potassium chloride or potassium nitrate.

Preferred zeolites to be treated by the process provided by the present invention are zeolite A (in which the number of moles of silica per mol of alumina in the general formula quoted above is approximately 2) and clinoptilolite (in which the said number of moles of silica is approximately 10), but zeolites of having an intermediate quantity of silica may also be used, for example zeolites X and Y (in which the said number of moles of silica are, respectively, approximately 2.5 and approximately from 3 to 5).

The fluoride which is present in the zeolites provided by the present invention is not necessarily all bound in the same way. In particular, it is possible for some of the fluoride to be removable with ease by water and for the remaining fluoride not to be removeable with ease by water but to be removable by the use of special solvents for example by that known by the Trade Name TISA-BIV (total ionic strength adjuster buffer IV). TISABIV (or TIS-IV) (Trade Name) is described in a handbook issued by Orion for use with their fluoride-specific electrodes, and it is used herein in accordance with the directions in that handbook.

If a zeolite provided by the present invention is to be used in an aqueous medium, then it may be preferable to wash it with water before use if it is desired to avoid an initial marked egress of fluoride in use. On the other hand the availability of fluoride from the zeolites provided by the invention may be utilised as, for example, by the use of the zeolites in toothpaste or other products where available fluoride may be required. In such an application the zeolite may also serve an abrasive function.

According to a further aspect thereof the present invention provides a process for at least partially removing metal ions from an aqueous solution, which comprises contacting the aqueous solution containing the metal ion with a zeolite according to the present invention. According to yet a further aspect, thereof, the present invention also provides a process for the chromatographic separation of two or more metal ions in aqueous solution wherein the chromatographic stationary phase comprises a zeolite according to the present invention. We believe that such separation may prove to be especially convenient when at least two of the metal ions are lanthanide or actinide ions, for example when one ion is $La^{3+}$ and the other ion is $Ce^{3+}$.

Chromatographic separation processes may be performed in the usual manner by taking advantage of the difference in affinity of the zeolite according to the present invention for the metal ions in question. Following a conventional technique, the aqueous solution may be applied to a column of the zeolite so as to put the ions into a narrow band at one end of the column, and then the band may be transmitted towards the other end of the column, with progressive separation of the band into two or more bands by application of a suitable eluent. This is, of course, only an example of a possible procedure with a column. It is not necessary, either, that a column should be used; for instance the zeolite could be incorporated into a thin layer on a support plate. It is possible also that a separation may usefully be performed by taking advantage of any peculiar form in a plot of the ratio of the concentration of the input solution to a column to the concentration of the outflow from the column with respect of a particular ion, against the cumulative volume of solution passed through the column. It will be seen from Tests 2, 4, and 5 hereafter that if a solution containing two ions is passed into a column of the zeolite, the solution emerging from the column may, in the initial stages at least, have a ratio of concentrations of the two ions different from that in the solution passed into the column. Moreover, the ratio in the solution emerging from the column may be time-dependent.

The zeolites provided by the present invention, the process for providing them and their use will now be illustrated by means of the following Examples 1 and 2, and by reference to FIGS. 1 to 6 and Tables I to III. The affinity of the zeolites for metal ions is demonstrated in the Tests following the Examples and by reference to FIGS. 7 to 9. Potassium analyses in Examples 1 and 2 were performed by means of atomic absorption flame spectrometry, while fluoride ion was estimated using the appropriate Orion ion-specific electrode.

Table I gives the analysis (weight %) of Hector Clinoptilolite before (A) and after (B) purification as described in Example 1.

Table II gives the X-ray powder diffraction pattern of the Hector clinoptilolite and the purified Hector Clinoptilolite (A and B) used in Example 1 and of the product (D) obtained by treated B firstly by exchanging sodium for potassium to obtain (C) and then by fluoride-treating C according to the invention.

Table III gives the X-ray powder diffraction pattern of the zeolite 4A used in Example 2(Q) and of the fluoride treated product thereof (S).

FIG. 1 gives the differential thermal analysis (DTA) of the purified potassium exchanged Hector Clinoptilolite (C) and of the fluoride treated product thereof (D) obtained according to Example 1. The temperature difference is expressed in arbitrary units on the ordinate. The units on the abscissa are in °C.

Figure 1:
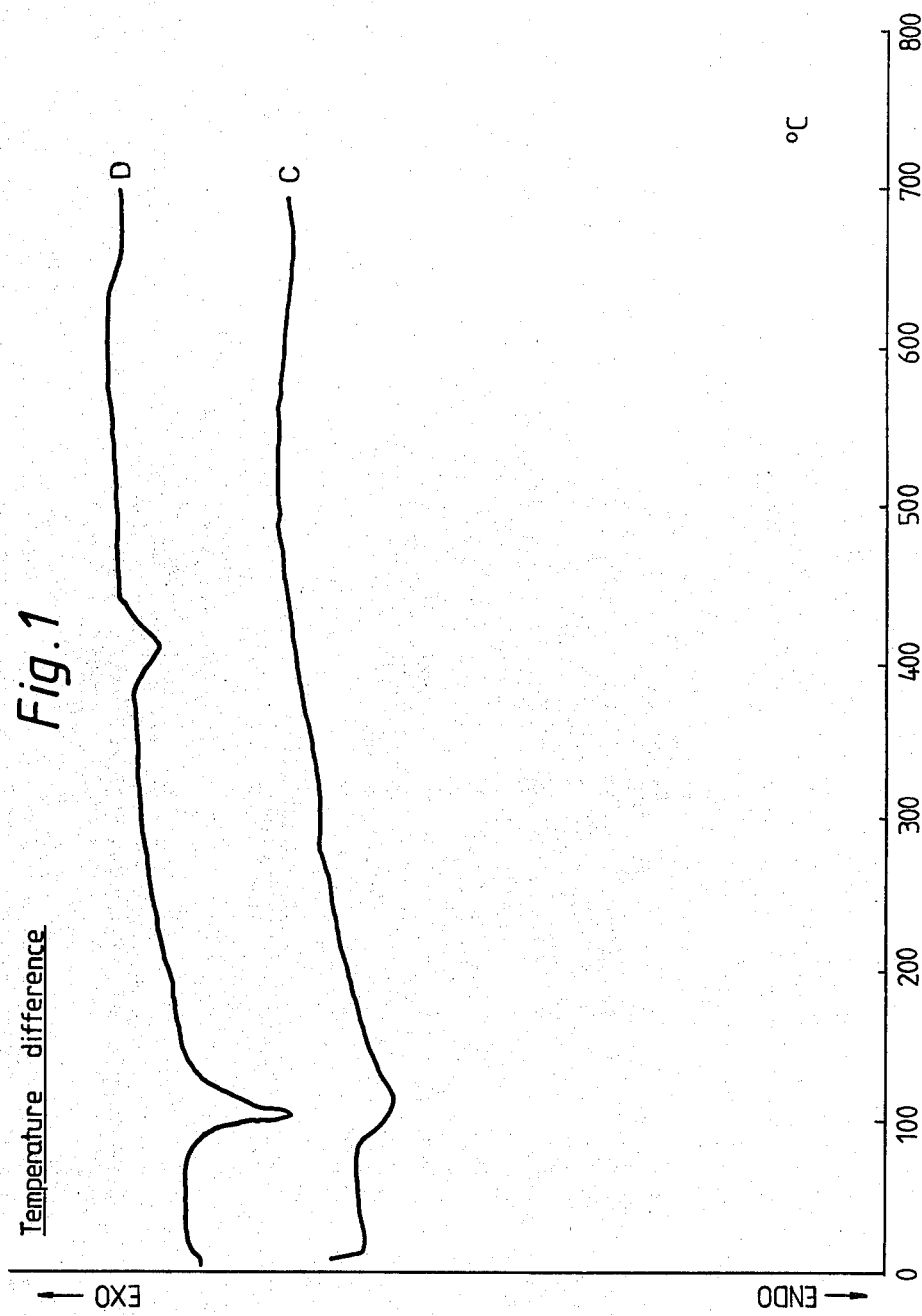
Figure 4:
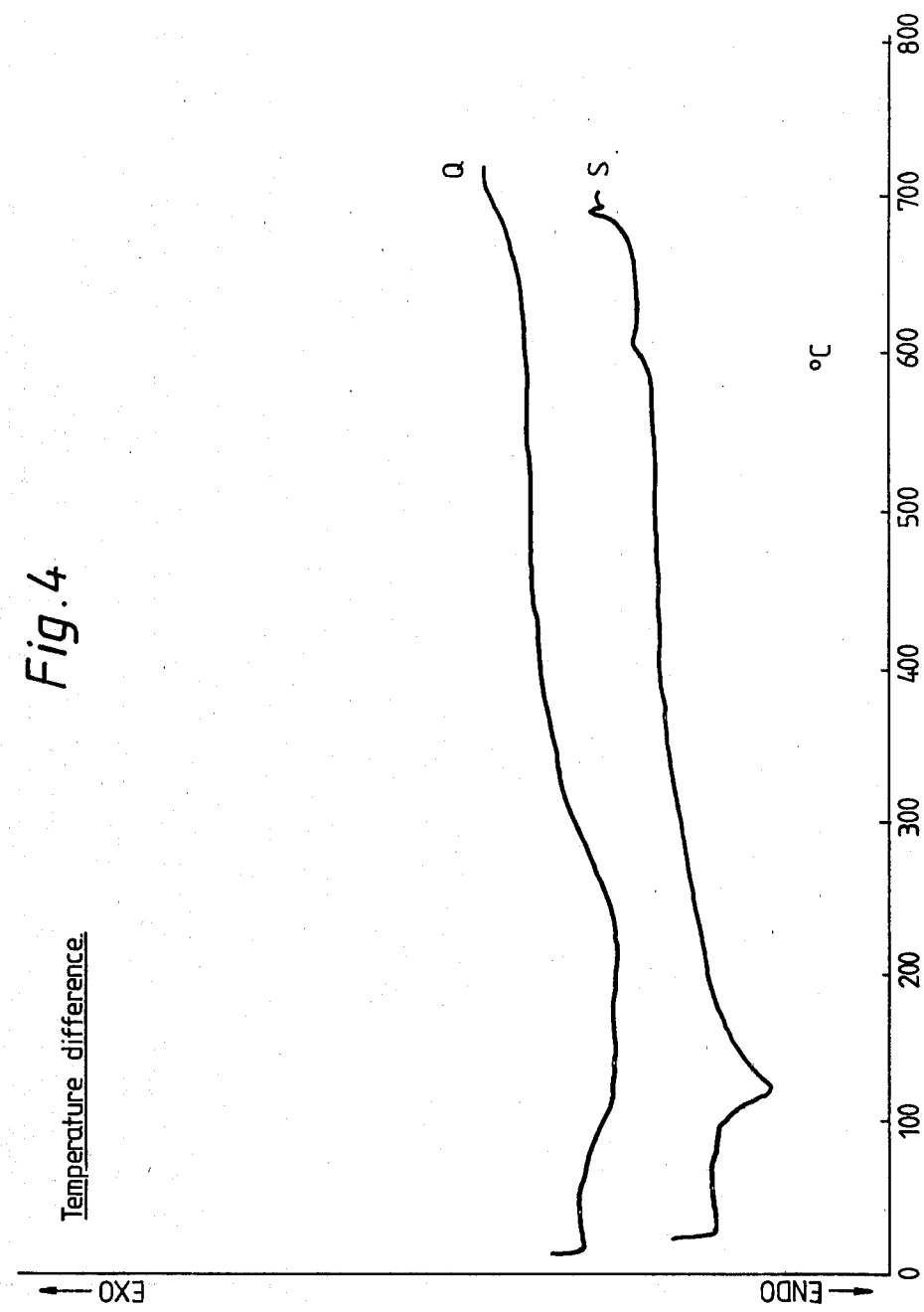

FIG. 4 gives the differential thermal analysis (DTA) of the zeolite 4A used in Example 2 (Q) and of the fluoride-treated product thereof (S) the units being the same as in FIG. 1.

Figure 2:
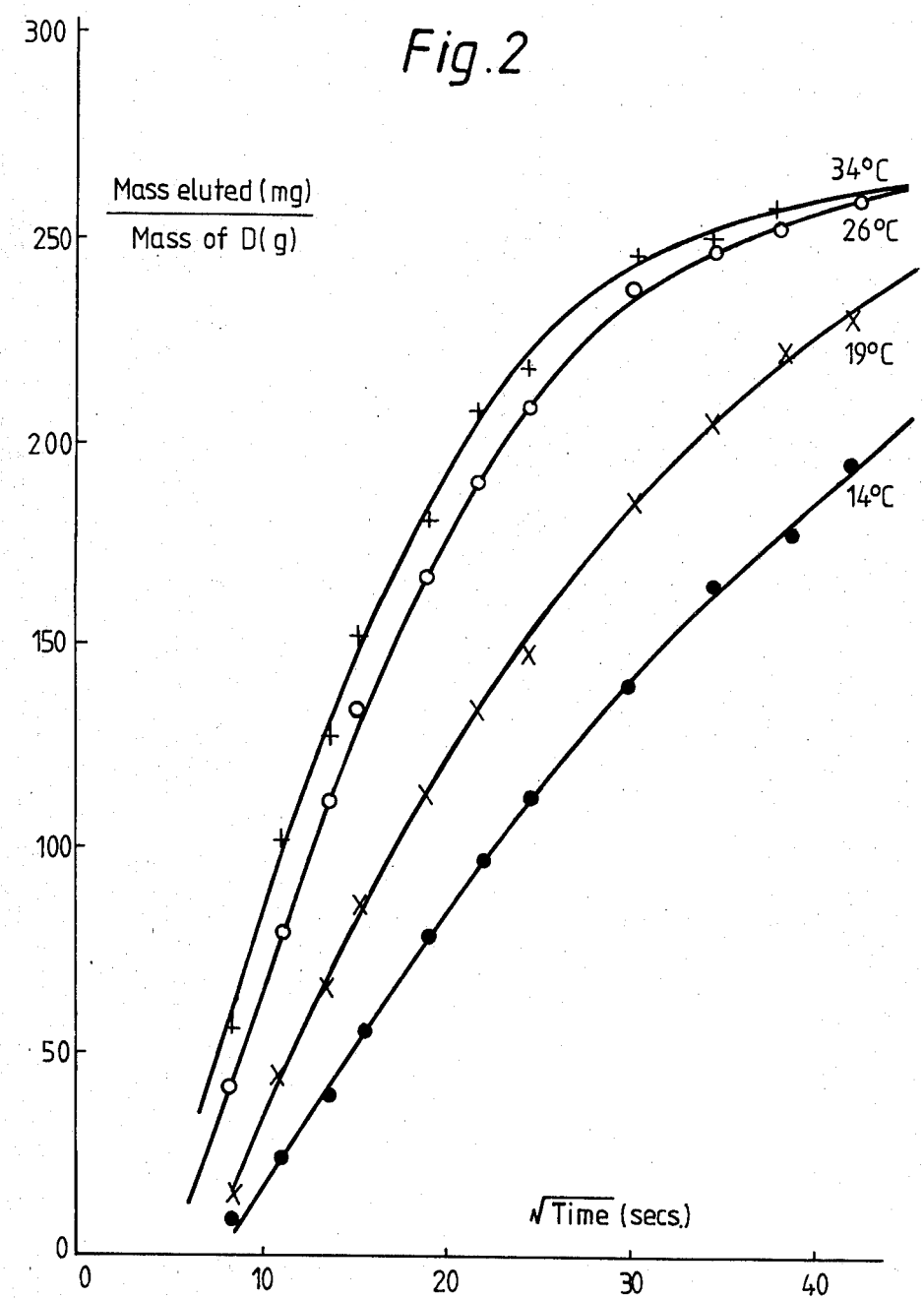
FIG. 2 is a plot of the mass of fluoride eluted (in mg) from the fluoride-treated Hector Clinoptilolite (D) (per g of D)) by means of TISABIV (1:1 vol in distilled water), against time ($\sqrt{\text{seconds}}$) for 4 different elution temperatures identified on the Figure.
Figure 5:
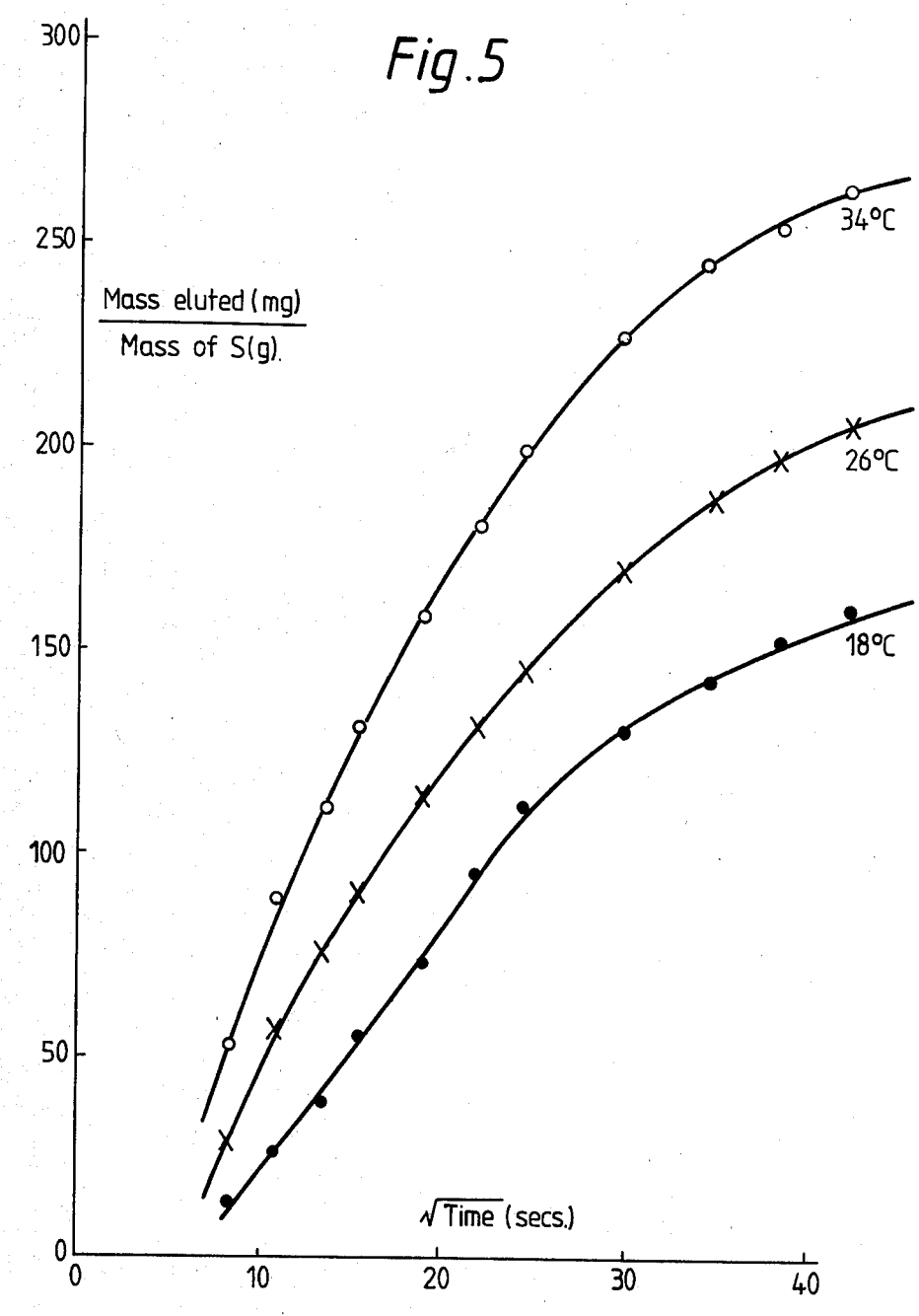

FIG. 5 is a plot of the same variables and using the same units as FIG. 2 using TISABIV eluent on the fluoride treated zeolite 4A (S).

Figure 3:
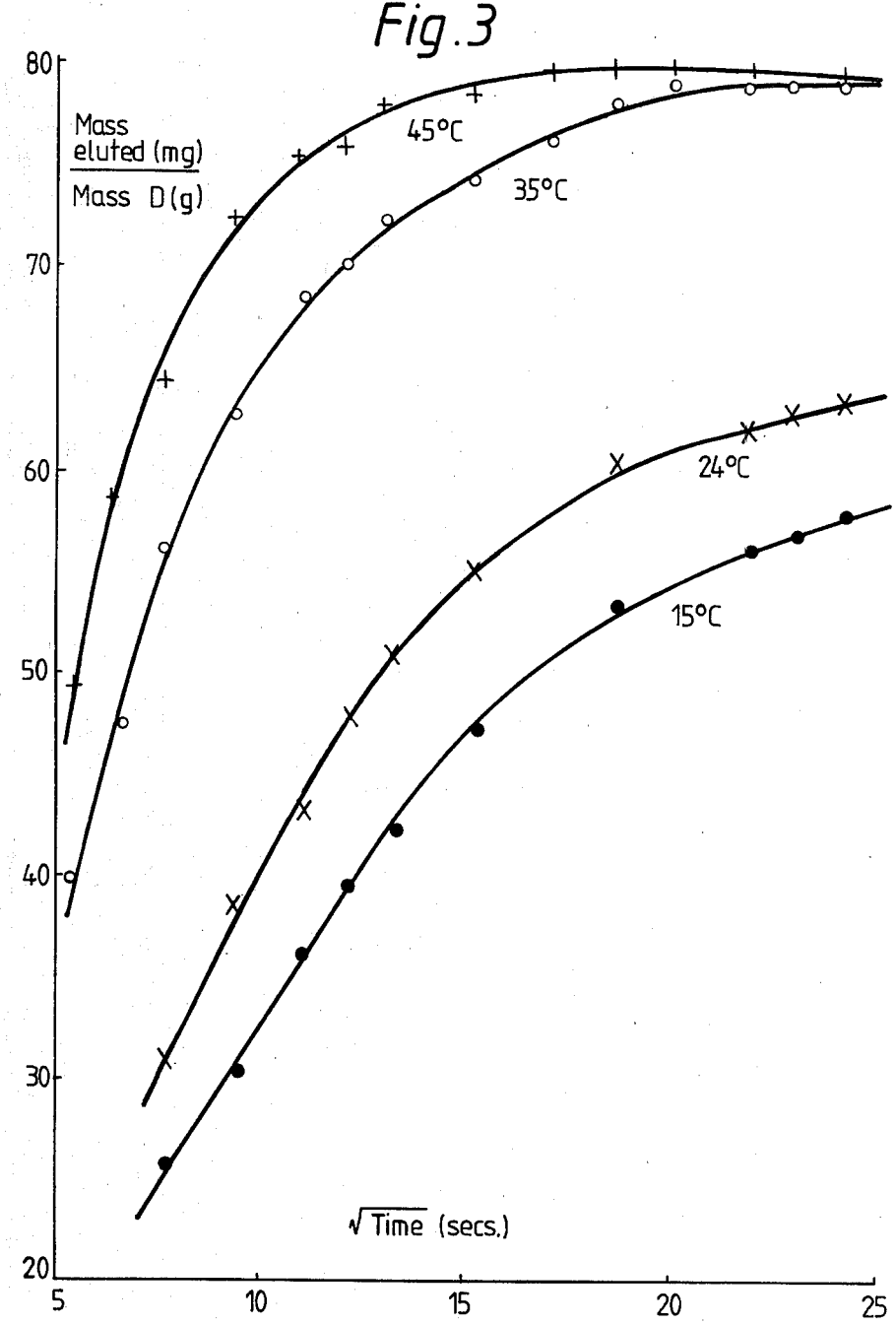
FIG. 3 is a plot of the same variables and using the same units as in FIG. 2 obtained for 4 different elution temperatures identified from the Figure the eluent being distilled water.
Figure 6:
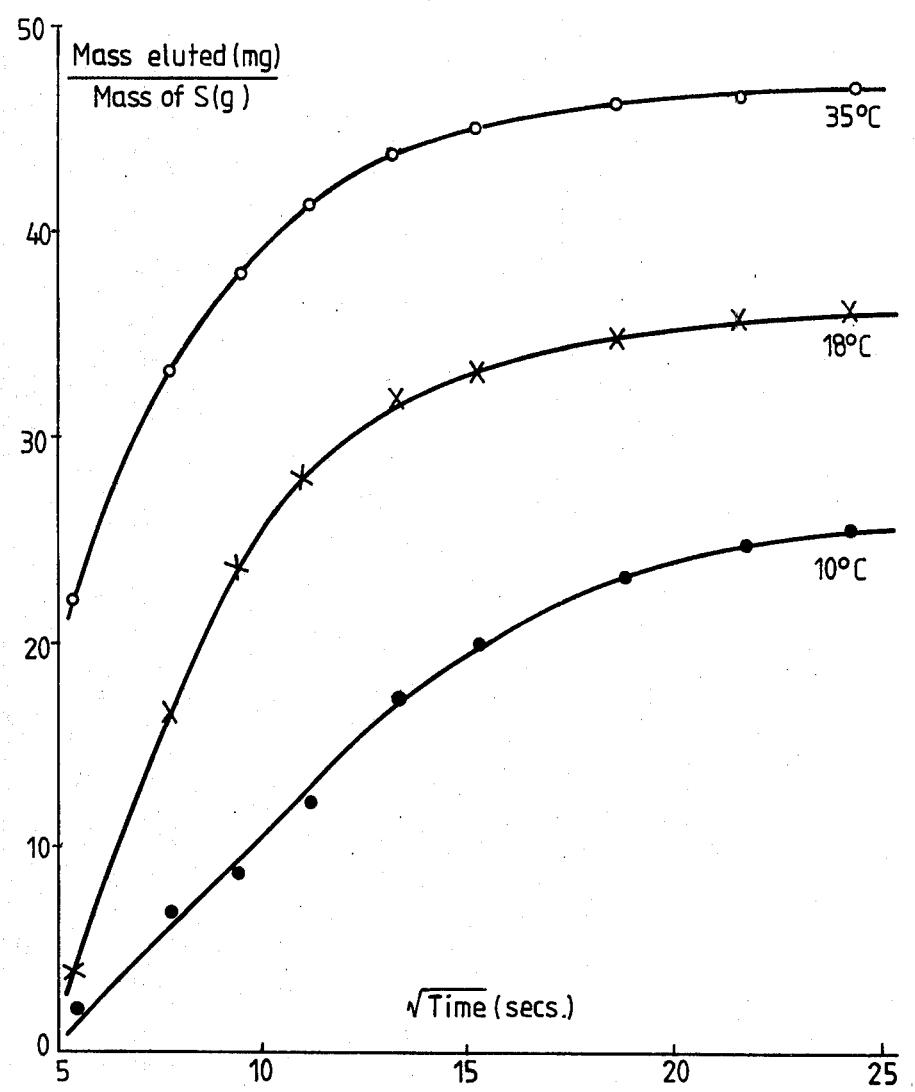

FIG. 6 is a plot of the same variables and using the same units as FIG. 3 obtained using a water eluent on the product (S).

Figure 7:
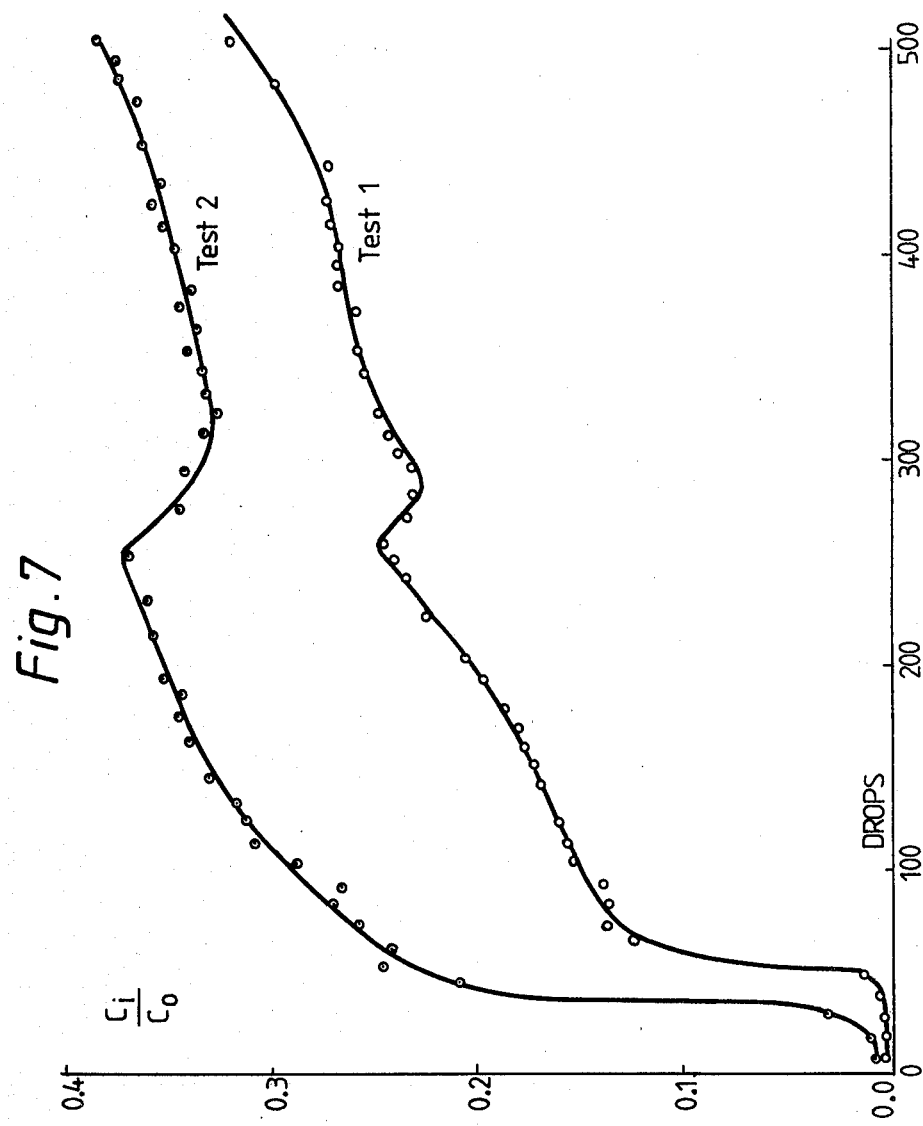
Figure 8:
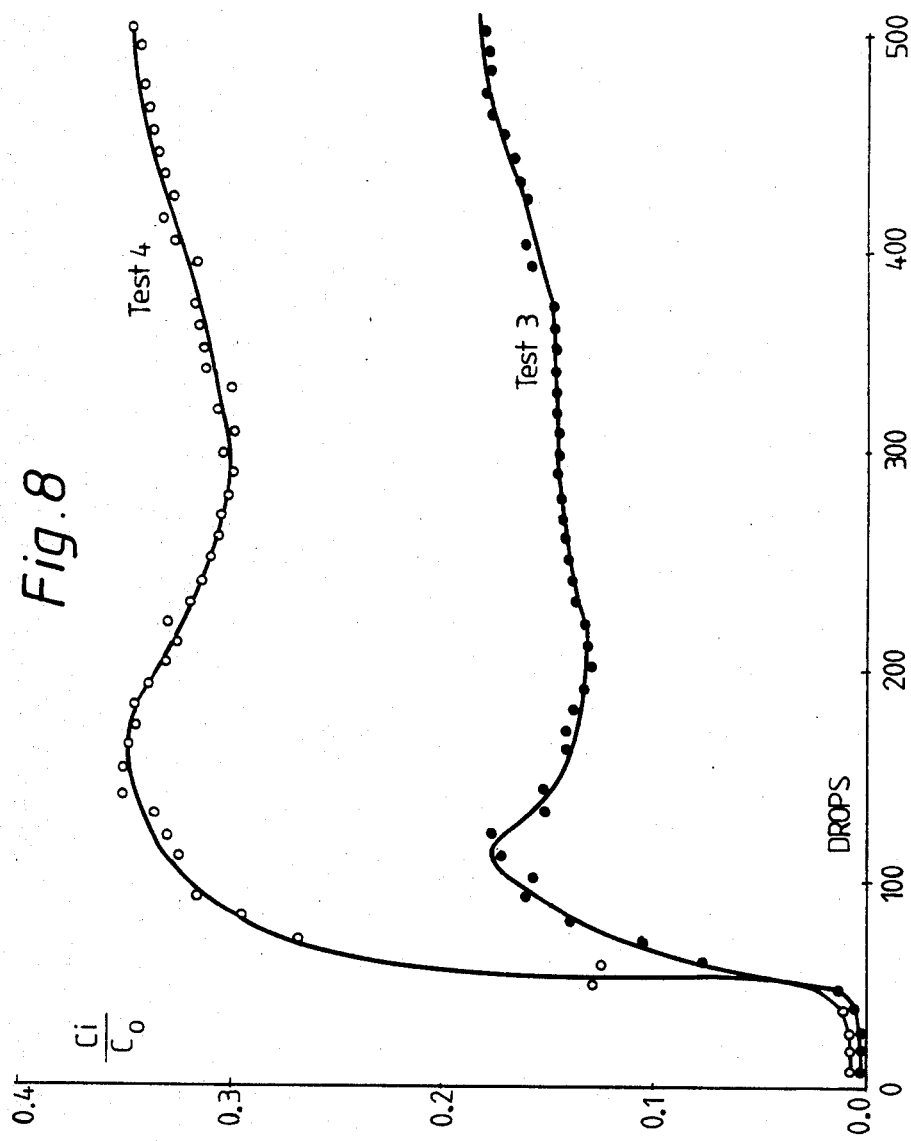
Figure 9:
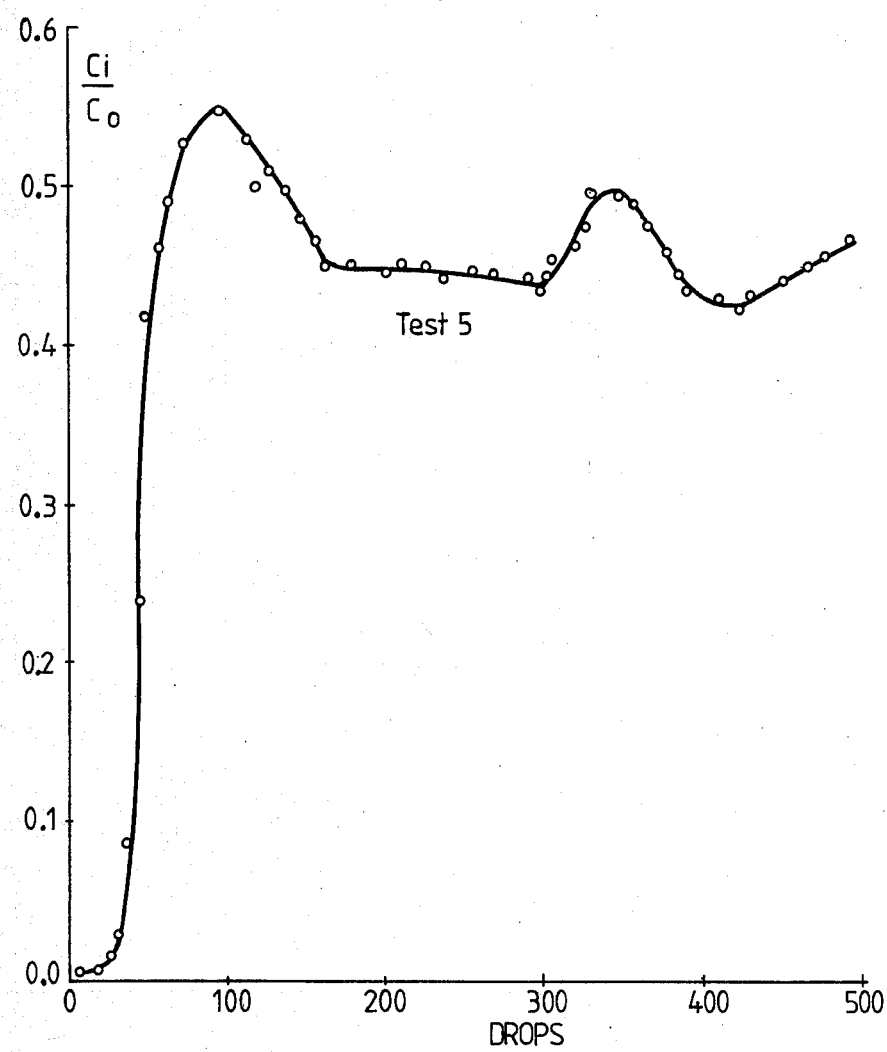

FIGS. 7–9 are plots of the ratio of activity (on the ordinate) of an input solution containing radioactive ions into a column (Ci) to the activity of the output solution (Co) against the cumulative volume (drops) of solution removed from the column (on the abscissa) in Tests 1 and 2 (FIG. 7), Tests 3 and 4 (FIG. 8) and Test 5 (FIG. 9) hereafter.

EXAMPLE 1

The starting material was Hector clinoptiolite supplied by the Baroid Division of National Lead (USA), which according to the suppliers was of 85–95% purity. The analysis of this material (which we shall refer to as A) is given in Table 1, and the X-ray powder diffraction pattern is given in Table II. Lines marked * in Table II are thought to be due to impurity phases.

Purification of A

A was powdered, refluxed with water to remove soluble impurities, refluxed with aqueous ammonium chloride solution (saturated at room temperature) to remove carbonates, washed with water until chloride-free, treated with an aqueous 1.0 mol/liter solution of NaCl to reduce the concentration of exchangeable cations other than sodium, washed with water until chloride-free, and dried at 100° C. in air. The analysis and X-ray powder diffraction pattern of the product (B) are given in Tables I and II.

Exchange of sodium in B for potassium

B was treated overnight, with stirring, at room temperature with an aqueous solution of KF of concentration 0.1 mol/liter, 20 cm³ of aqueous solution of KF being used per g of B. Then the solid was separated from the solution and heated in air at 100° C. for four hours to dry it and to give product C. Analysis indicated that each g of C contained 78 mg (1.99 mmol) of potassium. The X-ray powder diffraction lines in C correspond in position very closely to those in B.

Treating potassium exchanged zeolite C with fluoride

C was treated for 8 hours with 8 times its weight of molten $KF \cdot 2H_2O$ at 60° C. in a plastic beaker. The solid was separated from the liquid and washed four times with water to remove excess melt, and dried at 100° C. to yield product D.

Characterisation of D (fluoride-treated zeolite C)

(a) The X-ray powder diffraction pattern of d is given in Table II.
(b) The DTA trace of D included an endotherm at approximately 400° C. which was not present in that of C (see FIG. 1).
(c) Elution by TISABIV was capable of removing 256 mg (13.47 mmol) of fluoride ion from each g of D (see FIG. 2). It appears that such removal of fluoride by TISABIV was substantially complete, since the DTA trace of the material after such elution with TISABIV was very similar to that of C. The curves in FIG. 2 appear to indicate diffusion control.
(d) Analysis indicated that each g of D contained 232 mg (5.93 mmol) of potassium.

From (c) and (d) it follows that the molar ratio of $F^-$ to $K^+$ in D is 13.47:5.93=2.27:1. A molar ratio in this case is of course, identical with a ratio of equivalents.

Removal of fluoride with water from D

Elution with water was capable of removing up to 79 mg (4.16 mmol) of fluoride ion from each g of D (see FIG. 3). Therefore, in the product of this elution (E) the molar ratio of $F^-$ to $K^+$ is at least (13.47−4.16):5.93= at least 1.57:1 ("at least", because $K^+$ has probably also been eluted, in a quantity equivalent to the $F^-$ eluted).

Further experiments showed that the presence of halide and nitrate ions in the water retarded the removal of fluoride.

Exchange of $K^+$ in D for $Na^+$

It was found that the number of mmol of $Na^+$ which could be introduced per g of D using an aqueous 0.5 mol/liter concentration NaCl solution was 83.5% of the number of mmol which could be introduced per g of C.

TABLE I

|  | A | B |
|---|---|---|
| $SiO_2$ | 61.10 | 67.22 |
| $Al_2O_3$ | 10.52 | 11.08 |
| $Fe_2O_3$ | 0.91 | 0.78 |
| $TiO_2$ | 0.36 | 0.32 |
| CaO | 3.34 | 0.27 |
| MgO | 0.47 | 0.11 |
| $Na_2O$ | 5.30 | 5.38 |
| $K_2O$ | 1.48 | 0.60 |
| Loss at 110° C. | 8.36 | 6.17 |
| Additional loss at 900° C. | 8.72 | 7.44 |
| TOTAL % | 100.56 | 99.37 |

TABLE II

| A | | B | | C | |
|---|---|---|---|---|---|
| d/A | Int | d/A | I/Io | d/A | I/Io |
| 11.4 | w* | 8.70 | 80 | 7.7 | 30 |
| 8.8 | s | 7.80 | 55 | 5.1 | 20 |
| 7.8 | s | 6.81 | 57 | 4.2 | 25 |
| 6.8 | ms | 5.12 | 30 | 3.7 | 33 |
| 6.6 | mw* | 3.95 | 100 | 3.5 | 18 |
| 5.2 | mw* | 3.31 | 80 | 3.3 | 43 |
| 5.1 | ms | 3.14 | 44 | 3.14 | 16 |
| 4.62 | m | 3.09 | 47 | 3.1 | 18 |
| 4.5 | mw* | 2.94 | 56 | 2.94 | 100 |
| 4.35 | mw | 2.76 | 38 | 2.76 | 18 |
| 4.22 | mw* | 2.52 | 12 | 2.52 | 18 |
| 3/95 | vs | 2.42 | 19 | 2.41 | 58 |
| 3.85 | m | 1.94 | 15 | 2.1 | 93 |
| 3.31 | s* | 1.80 | 17 | 2.0 | 30 |
| 3.13 | m | 1.48 | 17 | 1.8 | 20 |
| 3.0 | m |  |  | 1.7 | 30 |
| 2.94 | s |  |  | 1.48 | 20 |
| 2.77 | s |  |  |  |  |
| 2.70 | m |  |  |  |  | s = strong
ms = medium-strong
m = medium
mw = medium-weak
w = weak

EXAMPLE 2

The starting material (Q) was zeolite 4A powder (sodium form) supplied by Laporte Industries Limited of Widnes, England. Q had diffraction pattern as given in Table III. Q was treated to exchange sodium for potassium in the same manner as described for B in Example 1 to obtain the product R. R was treated with fluoride in the same manner as described for zeolite C in Example 1 to obtain the product S. Analysis of R indicated that each g of R contained 204 mg (5.22 mmol) of potassium.

Characterisation of S (fluoride-treated zeolite A)

(a) The X-ray powder diffraction pattern of S is given in Table III.
(b) The DTA trace of S included an exotherm at about 600° C. which was not present in that of Q (see FIG. 4).
(c) Elution by TISABIV removed 311 mg (16.4 mmol) of fluoride ion from each g of S. It appears that such removal of fluoride by TISABIV was substantially complete, since the DTA trace of the material after elution with TISABIV was very similar to that of Q. FIG. 5 shown the early progress of elution with TISABIV. The curves in FIG. 5 appear to indicate diffusion control.
(d) Analysis indicated that each g of S contained 292 mg (7.49 mmol) of potassium.

From (c) and (d) it follows that the molar ratio of $F^-$ to $K^+$ in S is 2.19.

Removal of some fluoride with water from S

Elution with water was capable of removing 37 mg (1.95 mmol) of fluoride from each g of S (see FIG. 6). Therefore, in the product of this elution (T), the molar ratio of $F^-$ to $K^+$ has probably also been eluted in a quantity equivalent to the $F^-$ eluted.

Further experiments showed that the presence of halide and nitrate ions in the water retarded the removal of fluoride.

Cation exchange of $K^+$ in S for $Na^+$

It was found that the number of mmol of $Na^+$ which could be introduced per g of S with aqueous 0.5 mol/liter NaCl solution was 84.8% of the number of mmol which could be introduced per g of R.

TABLE III

| SAMPLE | | | |
|---|---|---|---|
| Q | | S | |
| d/A | I/Io | d/A | I/Io |
| 12.08 | 100 | 11.9 | 63 |
| 8.54 | 60 | 8.60 | 48 |
| 7.00 | 40 | 5.59 | 15 |
| 5.46 | 16 | 4.66 | 22 |
| 4.08 | 59 | 3.73 | 15 |
| 3.71 | 70 | 3.70 | 16 |
| 3.40 | 20 | 3.65 | 15 |
| 3.28 | 23 | 2.95 | 26 |
| 2.98 | 55 | 2.90 | 67 |
| 2.75 | 20 | 2.86 | 75 |
| 2.62 | 30 | 2.73 | 18 |
| 2.51 | 12 | 2.52 | 17 |
| 2.46 | 11 | 2.36 | 73 |
| 2.37 | 10 | 2.33 | 81 |
| 2.25 | 9 | 2.18 | 13 |
| 2.18 | 11 | 2.04 | 96 |
| 2.05 | 17 | 2.00 | 100 |
| 1.92 | 9 | 1.66 | 37 |
| 1.89 | 9 | 1.56 | 15 |
| 1.83 | 8 | 1.43 | 52 |
| 1.74 | 15 | 1.30 | 28 |
| 1.69 | 10 | 1.22 | 21 |
| 1.60 | 9 | 1.17 | 19 |
| 1.57 | 8 | | |
| 1.43 | 5 | | |
| 1.40 | 8 | | |
| 1.34 | 11 | | |
| 1.32 | 7 | | |
| 1.29 | 6 | | |
| 1.25 | 8 | | |
| 1.22 | 5 | | |

Tests 1 to 5

These tests were performed by passing a solution containing radioactive lanthanide cations into a column containing 1.5 g of D of 40–60 mesh size. The column had an outer diameter of 0.5 cm and the packed length of the column was about 10 cm. In FIGS. 7, 8, and 9 the results are presented as a plot of Ci/Co (the ratio of the activity of the solution emerging from the column to the activity of the solution put into the column against the cumulative number of drops of solution which have emerged from the column. The drop rate was 1 per 18±2 second and there were 10.5 drops per cm$^3$ of solution.

The solutions used differ from Test to Test as follows:

Test 1—an aqueous solution of $^{140}$La(NO$_3$)$_3$ of concentration 0.05 mol/liter.

Test 2—an aqueous solution of $^{140}$La(NO$_3$)$_3$ and inactive Ce(NO$_3$)$_3$, each solute concentration being 0.05 mol/liter.

Test 3—an aqueous solution of $^{144}$Ce(NO$_3$)$_3$ of concentration 0.05 mol/liter.

Test 4—an aqueous solution of $^{144}$Ce(NO$_3$)$_3$ and inactive La(NO$_3$)$_3$, each solute concentration being 0.05 mol/liter.

Test 5—an aqueous solution of $^{140}$La(NO$_3$)$_3$ and $^{144}$Ce(NO$_3$)$_3$, each solute concentration being 0.05 mol/liter.

Comparison of Tests 1 and 2 indicates how Ce$^{3+}$ competes with La$^{3+}$ for retention on D. When no Ce$^{3+}$ is present, 82% of the La$^{3+}$ is retained over a 500-drop period; when Ce$^{3+}$ is present 64% is retained.

Comparison of Tests 3 and 4 shows that, over a 500-drop period, 68% of La$^{3+}$ is retained in the absence of Ce$^{3+}$ and 60% in the presence of Ce$^{3+}$.

Test 5 gives, as expected, a plot which is some combination of those from Tests 2 and 4, and displays two activity maxima caused respectively by the presence in the aqueous solution of $^{144}$Ce and $^{140}$La.

Tests with C indicated no comparable effects to those depicted in FIGS. 7, 8 and 9, so that we believe that the effects with the fluorided zeolites are not simply due to exchange of Ce$^{3+}$ or La$^{3+}$ with K$^+$.

We claim:

1. A process for the production of a zeolite bearing fluoride anions and cations other than hydrogen, aluminium or silicon cations in which the number of equivalents of fluoride anions exceeds the sum of the numbers of equivalents of all cations present in the zeolite except for hydrogen, aluminium and silicon cations comprising treating the zeolite with an aqueous solution of a salt of hydrofluoric acid which comprises a melt of KF.2H$_2$O.

2. A process for the production of a zeolite bearing fluoride anions and cations other than hydrogen, aluminium or silicon cations in which the number of equivalents of fluoride anions exceeds the sum of the numbers of equivalents of all cations present in the zeolite except for hydrogen, aluminium and silicon cations comprising treating the zeolite with an aqueous solution having the approximate composition KF.2H$_2$O.

3. A process for the production of a zeolite bearing fluoride anions and cations other than hydrogen, aluminium and silicon in which the number of equivalents of fluoride anions exceeds the sum of the numbers of equivalents of all cations present in the zeolite except for hydrogen, aluminium and silicon cations comprising treating the zeolite with an aqueous solution of at least 50% by weight KF.

4. A process as claimed in claim 1 wherein, before treatment with the concentrated solution, exchangeable cations of the zeolite are replaced by cations identical to that of the salt of hydrofluoric acid.

5. A process as claimed in claim 4 wherein the replacement is conducted by contacting the zeolite with a dilute solution of a salt containing the cation identical to the cation of the salt of hydrofluoric acid.

6. A process as claimed in claim 5 wherein the said solution has a concentration of not more than 0.25 moles/liter of the said salt.

7. A process as claimed in claim 5 wherein the contact is at a temperature of not more than 40° C. over a period of at least 6 hours.

8. A process as claimed in claim 7 wherein the contact is at room temperature over a period of at least 12 hours.

9. A zeolite bearing fluoride anions and cations other than hydrogen, aluminum and silicon, in which the number of equivalents of fluoride anions exceeds the sum of the numbers of equivalents of all cations present in the zeolite except for hydrogen, aluminum and silicon cations, prepared by the process of claim 1.

10. A zeolite bearing fluoride anions and cations other than hydrogen, aluminum and silicon, in which the number of equivalents of fluoride anions exceeds the sum of the numbers of equivalents of all cations present in the zeolite except for hydrogen, aluminum and silicon cations, prepared by the process of claim 2.

11. A zeolite bearing fluoride anions and cations other than hydrogen, aluminum and silicon, in which the number of equivalents of fluoride anions exceeds the sum of the numbers of equivalents of all cations present in the zeolite except for hydrogen, aluminum and silicon cations, prepared by the process of claim 2.

* * * * *